United States Patent [19]

Lee

[11] Patent Number: 4,616,153

[45] Date of Patent: Oct. 7, 1986

[54] CLOSED-LOOP LINEAR POSITION SERVOMOTOR

[76] Inventor: Robert E. Lee, 68 Dean St., Westwood, N.J. 07675

[21] Appl. No.: 680,137

[22] Filed: Dec. 10, 1984

[51] Int. Cl.[4] ........................................... H02K 41/00
[52] U.S. Cl. ..................................... 318/687; 310/13; 310/27; 318/135
[58] Field of Search ..................... 310/12–14, 310/27; 318/135, 696, 687

[56] References Cited

U.S. PATENT DOCUMENTS

| | | | |
|---|---|---|---|
| 3,417,268 | 12/1968 | Lace | 310/27 |
| 3,439,198 | 4/1967 | Lee | 310/274 |
| 3,586,891 | 6/1971 | Applequist | 310/13 |
| 3,751,693 | 8/1973 | Gabor | 310/13 |
| 3,917,987 | 11/1978 | Inoue | 318/687 |
| 4,163,911 | 8/1979 | Simes et al. | 310/27 |

*Primary Examiner*—Donovan F. Duggan
*Attorney, Agent, or Firm*—M. K. Silverman

[57] ABSTRACT

There is disclosed a closed-loop, linear position servomotor. The servomotor includes a tubular armature disposed within a tubular stator in which the stator includes, radially disposed throughout the shell thereof, a plurality of magnetically symmetric field magnets, each having its magnetic axis directed to the radial center of the stator and armature. The stator further includes a plurality of symmetric, longitudinally disposed alternating current excitation windings, the longitudinal extent of such windings corresponding to the extent of change in linear position of the servomotor. The armature of the servomotor has a non-magnetic substrate upon which is longitudinally wound high current, direct current windings, these windings comprising the primary windings of the servomotor, with the excitation windings of the stator comprising the secondary windings of the motor. Further provided is a subsystem for sensing the position of the armature relative to the stator and, in addition, feedback means for communicating to computing means, the output of said armature position sensing subsystem and, after processing, transmitting a control signal to said excitation windings to effectuate control of the armature position relative to the stator.

3 Claims, 9 Drawing Figures

CLOSED-LOOP LINEAR POSITION SERVOMOTOR

BACKGROUND OF THE INVENTION

The present invention relates to a closed-loop linear position servomotor, such motor having particular utility in the creation of computerized, electronically controlled heart analogs, such heart analogs being particularly useful in cardiac research involving the study of both healthy hearts and abnormal hearts, such abnormalities being studied across a wide range of hemodynamics including such conditions as arrhythmia and fribrillation.

The study of various hemodynamic conditions by researchers, physicians and the like has been limited by the infrequency with which certain heart conditions occur. Also, the use and testing of pacemakers, artificial heart components and other cardiopulminary related devices is most difficult in the absense of a robotic simulation of the various conditions and situations within the human heart which the particular medical devices are intended to treat.

Prior art efforts directed to hemodynamic simulation are, in the art, known as the roller pump, centrifugal pump, flexible bladder pump, and the pusher plate pump. A patent reflective of the latter design is U.S. Pat. No. 3,874,002.

Despite advances in robotic technology and computer science, there has not, to date, existed hemodynamic instrumentation capable of real time simulation of heart function and malfunction. Accordingly, the present invention, while consituting a servomotor which is per se novel, and is of particular utility in the area of heart condition simulation.

The present invention is believed to be properly classified in U.S. Class 310, Subclasses 13 and 28.

SUMMARY OF THE INVENTION

The present invention comprises a closed-loop linear position servomotor having a tubular armature disposed within a tubular stator. The stator is provided with a plurality of radially, symmetrically oriented field magnets each having their magnetic axis directed toward the axial center of the armature and stator. The stator is further provided with a plurality of symmetrically disposed longitudinally high frequency AC excitation coils. The armature, the substrate of which is formed of a non-magnetic material has, longitudinally wound thereon, as the primary windings of the servomotor, high current DC windings. The longitudinal length of said high current DC windings of the armature is at least as great as the greatest extent of reciprocation of the armature relative to the stator contemplated in a particular application of a servomotor. The excitation windings are provided with an electromagnetic coupling to a zero-reference point to, therefrom, generate an electronic output into a feedback sensor, such sensor connected to electronic processing means to generate therefrom a correction or control signal to the primary windings upon the armature and, thereby, correct or otherwise control the linear position of the armature relative to the stator.

It is accordingly an object of the present invention to provide a positional and/or velocity servomotor in which the position and velocity of the armature relative to the stator may be precisely controlled.

It is a further object to provide a servomotor of the above type having a particular utility in connection with simulation of functions and dysfunctions of a human heart.

It is another object of the present invention to provide a servomotor suitable as a component of a computer-assisted simulation of one or more hemodynamic conditions.

The above and yet further objects and advantages of the present invention will become apparent from the hereinafter set forth detailed description of the invention, the drawings, and the claims appended herewith.

It is a yet further object to provide a servomotor capable of producing a linear-responsive output which will selectively follow any two of the three input parameters of position, velocity and force.

DETAILED DESCRIPTION OF THE INVENTION

Figure 1:
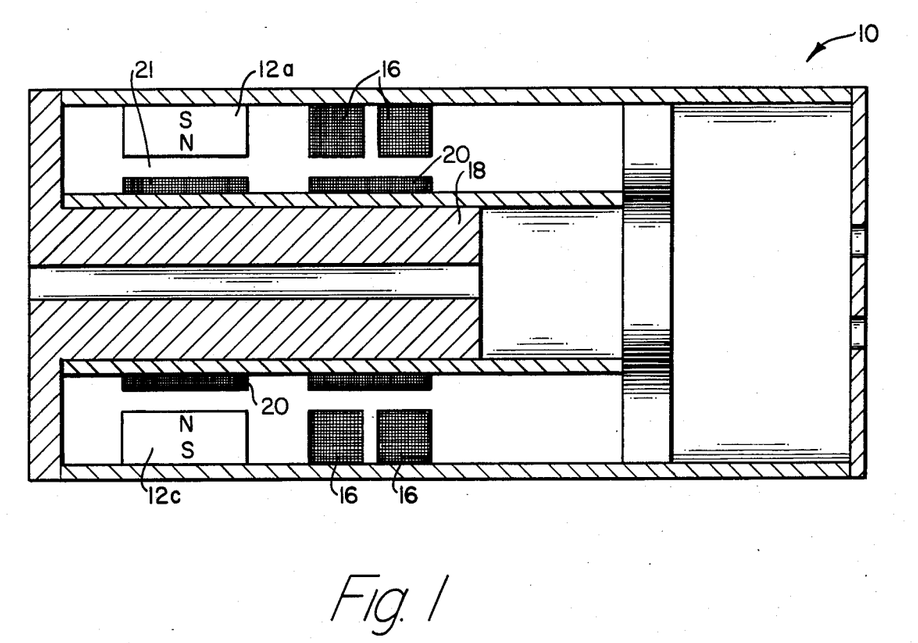
FIG. 1 is a longitudinal, cross-sectional schematic view of the present servomotor.
Figure 2:
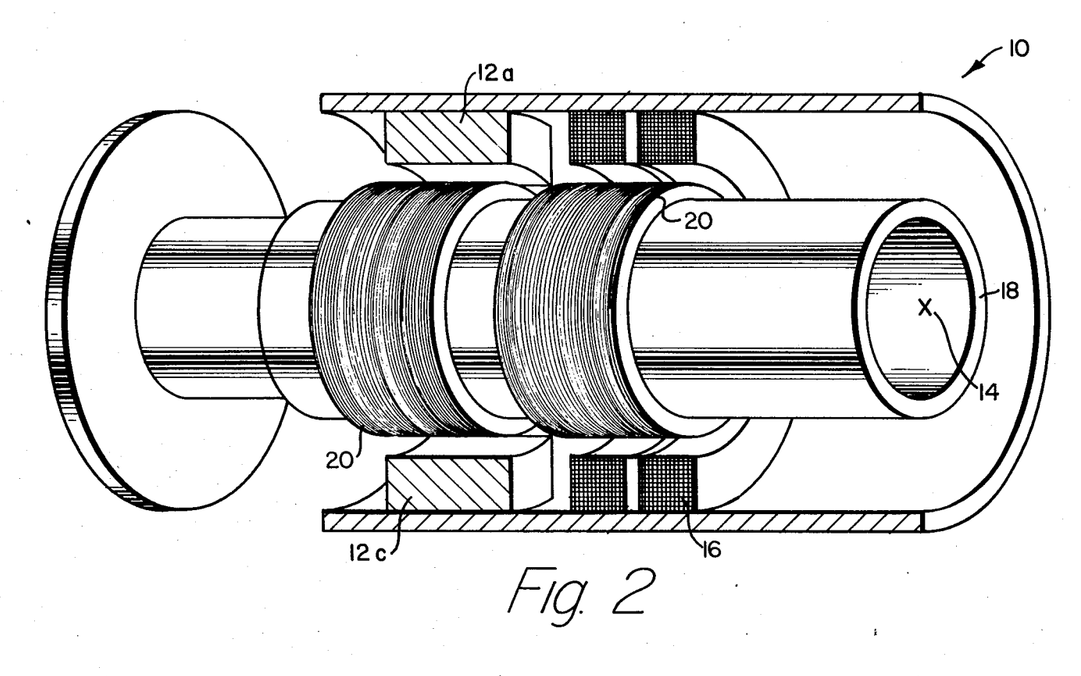
FIG. 2 is a cut-away perspective schematic view showing the radial disposition of the stator pole magnets and showing the air gap between the armature and stator.
Figure 3:
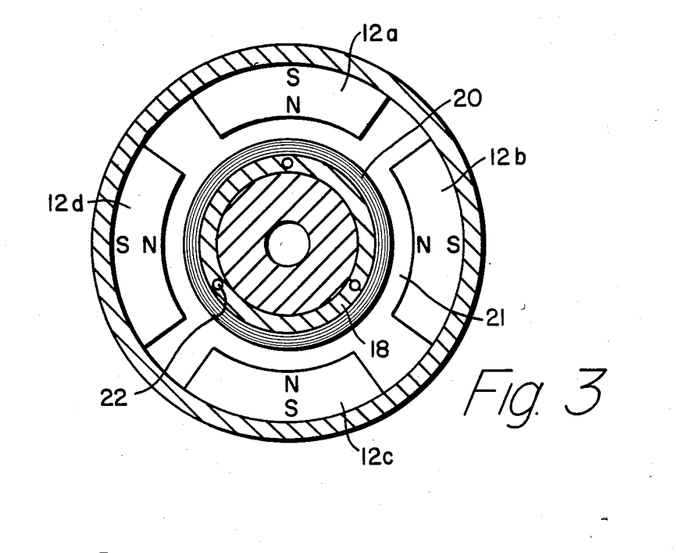
FIG. 3 is a radial cross-sectional view of the stator and armature, through the plane of the pole magnets.

With reference to FIGS. 1, 2 and 3, there is shown a hollow tubular stator 10 having radially disposed throughout the shell thereof a plurality of magnetically symmetric field magnets 12a, b, c and d. In the embodiment of FIGS. 1 thru 3, the stator 10 comprises a hollow cylinder and as shown in FIG. 3, the four field magnets 12 are angularly disposed at a fixed radius within the stator structure. It is noted, from FIG. 3, that the magnetic axis of each of the field magnets 12 is directed to the radial center 14 of the cylindrical stator 10.

As is noted in FIG. 1, the stator also comprises a plurality of symmetrical longitudinally disposed alternating current feedback windings 16. The feedback windings 16 extend longitudinally to an extent at least as great as the expected change in linear position of the armature (below described) of the present inventive servomotor. It is to be appreciated that the feedback windings 16 comprise, in motor nomenclature, the secondary windings of the servomotor, and serve a position loop control function.

Shown in FIGS. 1 thru 3 is a tubular armature base 18, said armature base formed of a non-magnetic material such as plastic. Upon the base of the armature is a multiplicity of high current, excitation windings 20.

These windings comprise the so-called primary windings of the present inventive motor and, thereby, will electromagnetically interact with the feedback windings 16. The radius of stator 18 will of course be less than the inner-diameter of the stator 10 in order to, thereby, create an air gap 21 in the annular region between the armature and stator.

It is to be appreciated that the number of pole magnets 12 may be greater or less than four and the number of excitation windings 20 may be greater or less in number than the two windings shown in FIG. 1. However, in any embodiment of the present invention, the magnetic axes generated by both the pole magnets and excitation windings must be symmetrical and must be directed toward the axial center 14 of the motor.

A preferred material for the field magnets 23 is sumarian cobalt. However, it is to be understood that the other materials and, as well, electromagnet equivalents of the permanent magnets 12 may be employed to practice the invention.

There may be optionally provided brass rod slides 22, the function of which is to facilitate the reciprocal movement of the armature 18 responsive to signals generated by the feedback windings 16. See FIG. 3.

Figure 4:
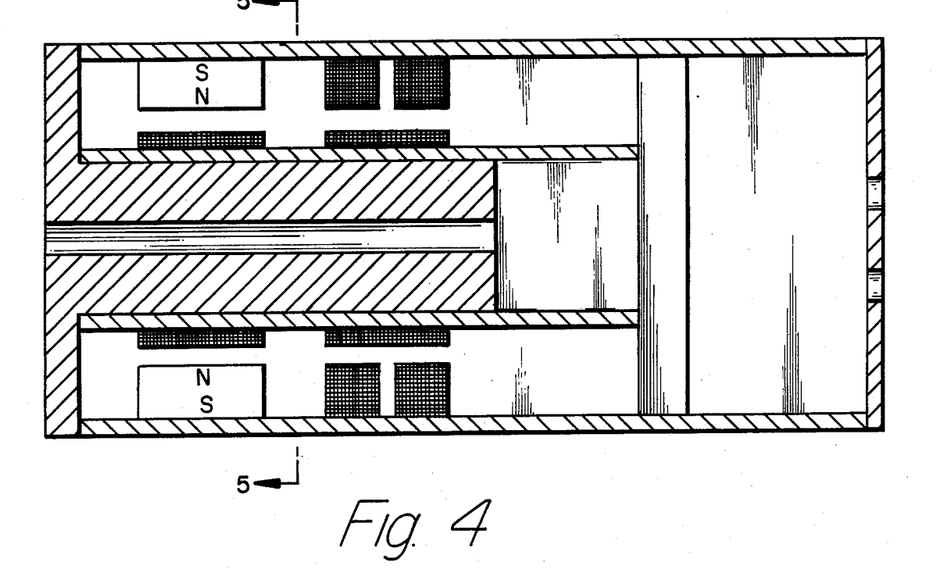
FIGS. 4 and 5 are cross-sectional, longitudinal and radial views respectively of a second embodiment of the present inventive servomotor.
Figure 5:
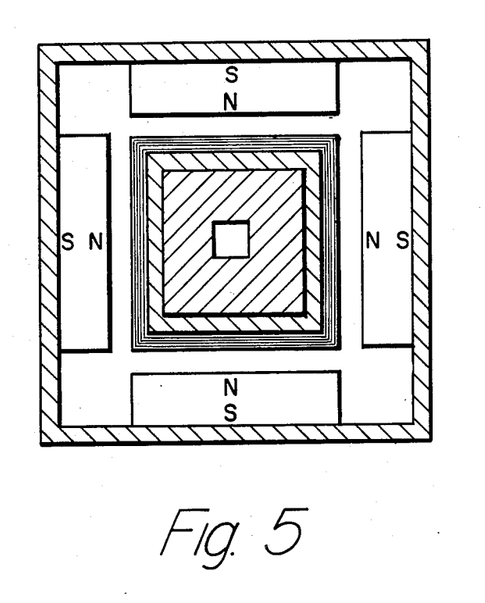

In FIGS. 4 and 5 are shown alternate embodiments of the present linear position servomotor in which the basic geometry of the tubular stator is replaced by a solid rectangular hollow structure and in which the tubular armature is replaced by an elongate solid rectangular structure. Correspondingly, the permanent magnets of the first embodiment (of FIGS. 1 thru 3) are replaced by elongate solid rectangles in the embodiment of FIGS. 4 and 5. Despite the difference in geometry between the respective embodiments, the principles of operation, in the two, are identical.

Figure 6:
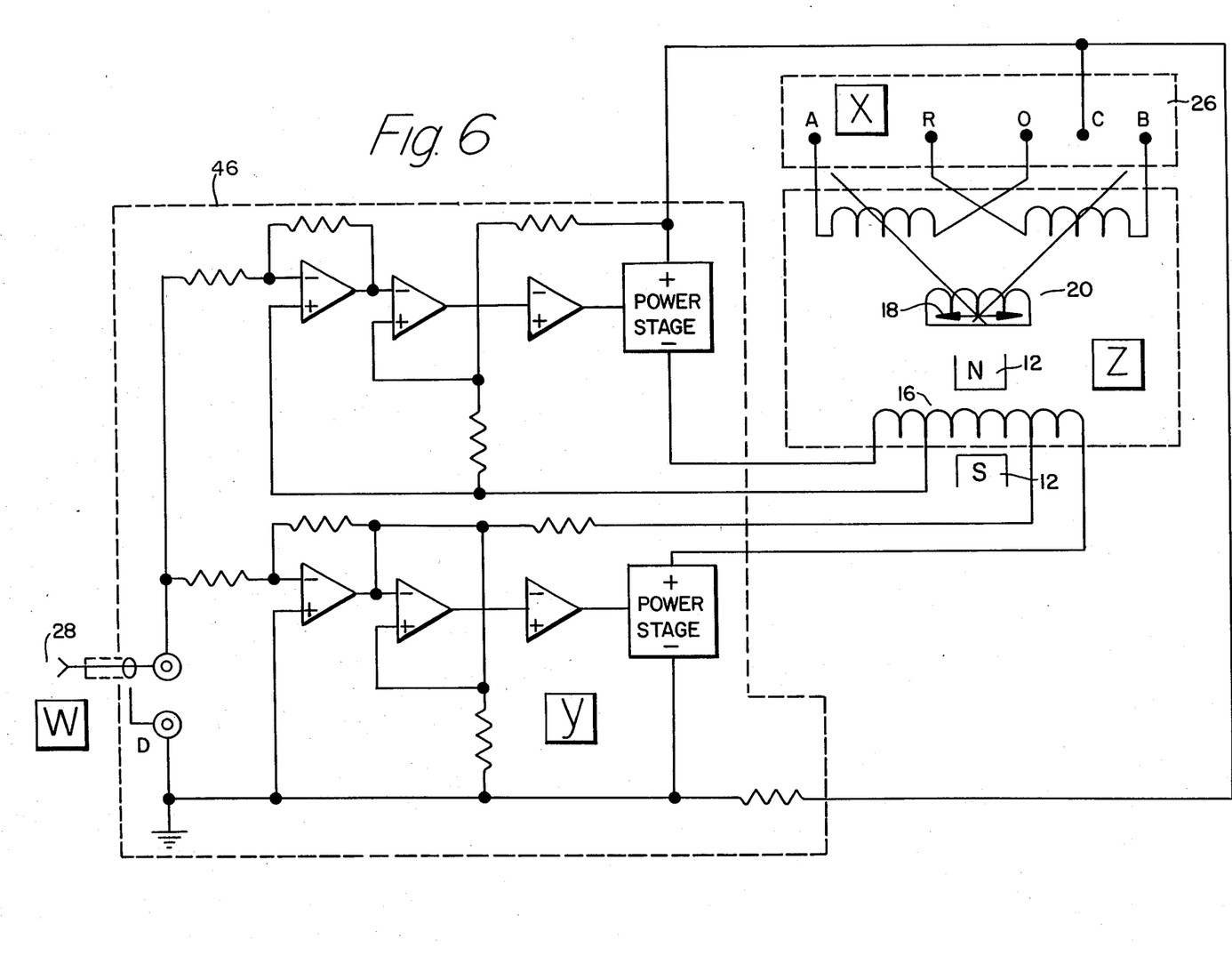
FIG. 6 is an illustration of the servo AMP and feedback systems of the present servomotor with relationship to the control system.

In FIG. 6 appears an illustration of the servo amplifier and feedback areas of the servomotor system in relationship with the control system. More particularly, there is shown sensing and interface means 26 which is electromagnetically coupled to the servomotor for monitoring the position of the armature 18 relative to zero reference positions "R" and "O". The sensing means 26, which is illustrated in more particular detail in FIG. 7, makes possible the conversion of positional data into an electronic signal that can be fed to feedback means 46. The feedback means 46 will, through simple differentiation, translate position information into velocity information such that a processing means 28, i.e., a control computer will constantly be receiving information from sensing means 26 regarding the position, velocity, force, current and voltage of the armature 18 and the servomotor, and generating compensating control signals with regard to position, velocity and force.

Figure 7:
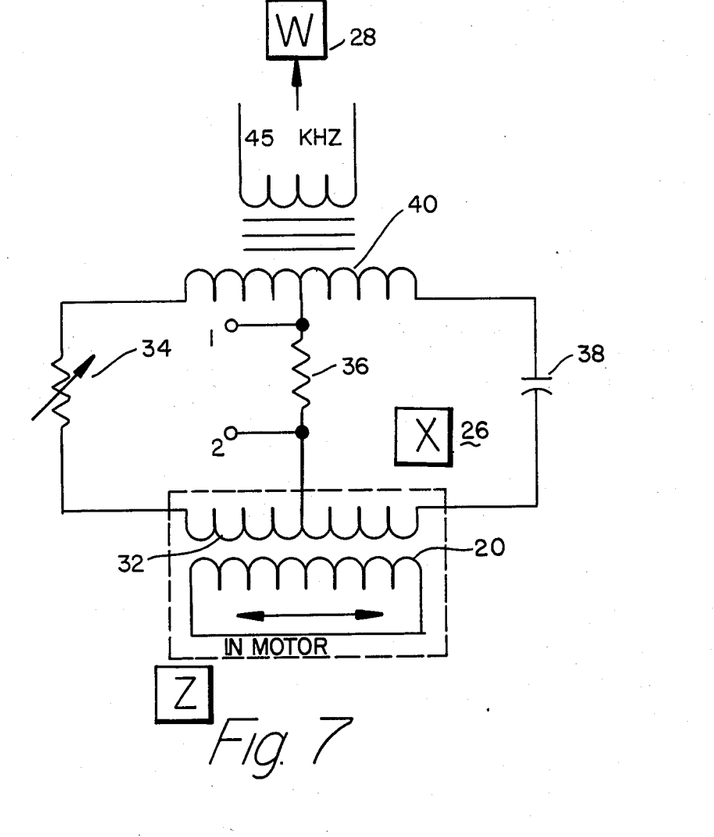
FIG. 7 is an electrical schematic of an alternate means for sensing the position of the armature relative to the stator.
Figure 8:
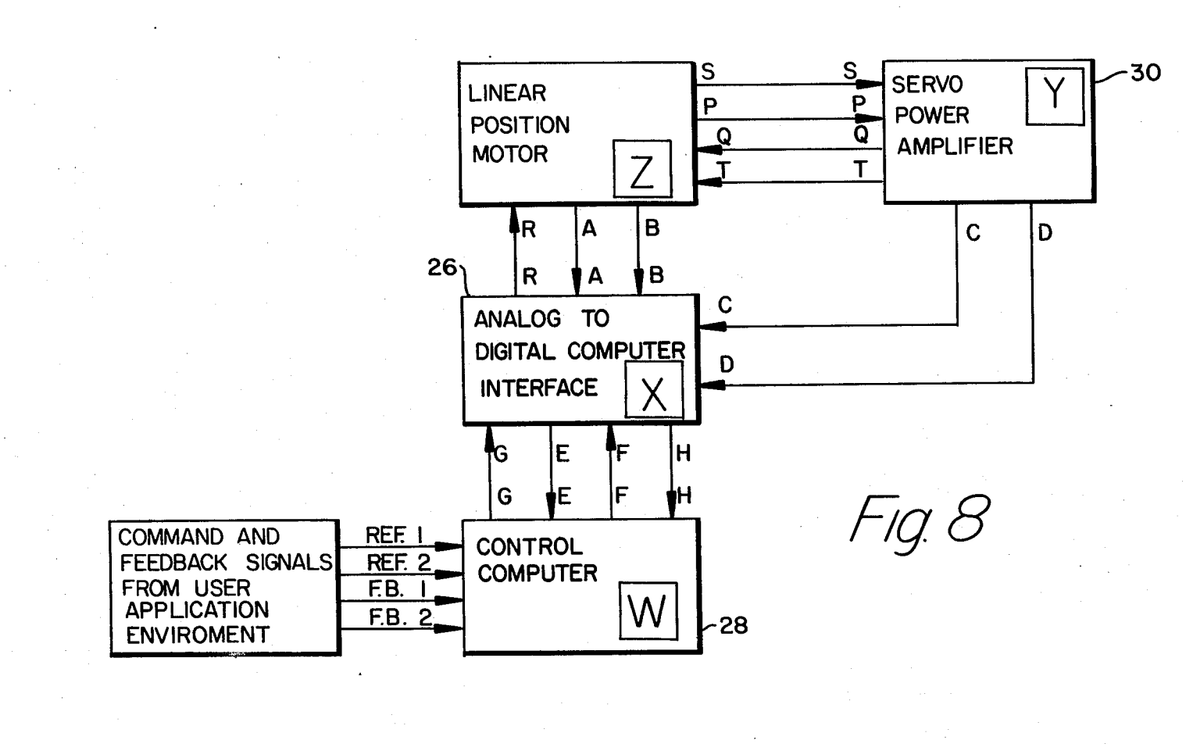
FIG. 8 a system diagram of the servomotor in combination with the control, amplifier, and computer control means of an application environment simulation system.

In FIGS. 6 to 8, it is to be appreciated that the Letter X is used in connection with said sensing means 26 which, as is more fully described below, also comprises a computer interface. The processing or computer means 28 is, in the drawings, alternatively referred to by Letter W. Additionally, the power amplifier of the servo system is alternatively referred to by reference numeral 30 and Letter Y. Finally, the motor, as a whole, is referred to by Letter Z.

It is to be understood that the generalized function of sensing and interface means 26 is to provide an output to processing means 28 which, responsive to a program corresponding to a particular hemodynamic (or other) condition, will generate a correction or control signal; this signal, after amplifying through power amp 30, acting to control the high frequency signal into excitation windings 16 which, thereby, will control the high DC current through armature windings 20 and, thereby, will precisely control the movement of armature 18 relative to reference points "R" and "O".

In FIG. 7 there is shown a circuit diagram of the sensing and interface means 26 by which the movement, velocity force and electrical parameters of the armature are precisely monitored. More particularly, FIG. 7 shows a center tap coil 32 symmetrically disposed about the zero reference point. There is further provided a variable resistor 34, a fixed resistor 36 and a capacitor 38 having a center tap transformer 40. The center tap transformer 40 actually comprises the front end of the processor 28 which is continuously sensing the position and other analog data generated by the sensing and interface means 26. The processing means picks signals off from Points 1 and 2, on either side of resistor 36, and feeds them into an analog-to-digital convertor (not shown). The digital output thereof is converted into binary numbers of, for example, between 0 and 1,000 bits. These signals will be divided centrally about the binary point of 500 thus giving a negative signal of 500 bits below the desired reference position of the armatur and of 500 bits in the opposite direction Therefore, on a scale of 0 to 1,000 bits, bit 500 would represent the null point for a zero control signal such that no control or change of armature position, velocity or force would occur at bit 500. However, at any bit other than 500, the processing means W would generate a controllable signal to thereby cause the excitation windings 16 to magnetically interact, either positively or negatively, and at a desired velocity and phase, to precisely control the parameters of the armature relative to the stator. It is noted that the present servomotor is strictly closed-loop; that is, the motor always operates in conjunction with its control sub-systems W, X and Y.

The interface of the motor A with its control sub-systems W, X and Y is shown in greater detail in the illustration of FIG. 8. In FIG. 8 is shown the various interfaces between the motor Z, the control computer W, the servo amplifier Y, and the computer interface X. In particular, the intra-system signal interfaces include the following:

Signal A is a zero phase voltage magnitude signal.

Signal B is a 180 degree phase voltage magnitude signal.

Signal C is a torque current signal.

Signal D is a voltage reference feedback signal.

Signal E is a digital position signal from the interface X to the control computer W, providing a binary output from the computer interface X, this being representational of the linear position of the armature.

Signal F is a digital displacement signal, i.e., the signal that the computer is sending to the servo-controller 16, thus telling the armature what the degree of linear displacement within a given timeframe is to be.

Signal G is a digital reference point. G Signal will operate should the zero point begin to drift; this drifting will be sensed by the computer and will be compensated by Signal G. In other words, computer Signal G keeps the electronic zero of the system in conformance with the "real world" zero position shown in FIGS. 6 and 7.

Signal H is a current reference from computer W to the servo amplifier Y, this function communicates the maximum force that the computer wants the motor to deliver to the load. It is, thereby, a current limit reference.

Signal P is an armature compensation. This compensation signal coming off of the taps of the armature where, for whatever reason, the electromagnetic coupling between the primary and the secondary fails to create the desired current level within the armature.

Signal Q is an armature current source of Signal T. Thereby, P may be viewed as the source of the armature compensation signal and S is the return of the same signal.

Signal R is a position reference from the computer interface X.

Signal S is a part of the velocity compensation signal from the armature and, thereby, is related to Signal T.

Signal T provides current in the motor winding.

With further reference to FIG. 8, it is to be appreciated that into motor Z flow Signals Q, R and T. Out of motor Z flow Signals A, B, P and S.

With regard to computer interface 26 (Subsystem X), Signals A, B, C, F and G flow thereinto, and out of computer interface 26 (Subsystem X) flow Signals D, H, E and R.

Into computing means 28 (Subsystem W), flow Signals E and H. Out of computing means 28 (Subsystem W), flow Signals F and G.

Into the amplifier 30 (Subsystem Y) flow Signals D, H, P and S. Out of amplifier 30 (Subsystem Y) flow Signals C, Q and T.

With reference to the lower left hand corner of FIG. 8, it may be noted that command and feedback signals from the user application environment are inputted to the computer control 28.

Figure 9:
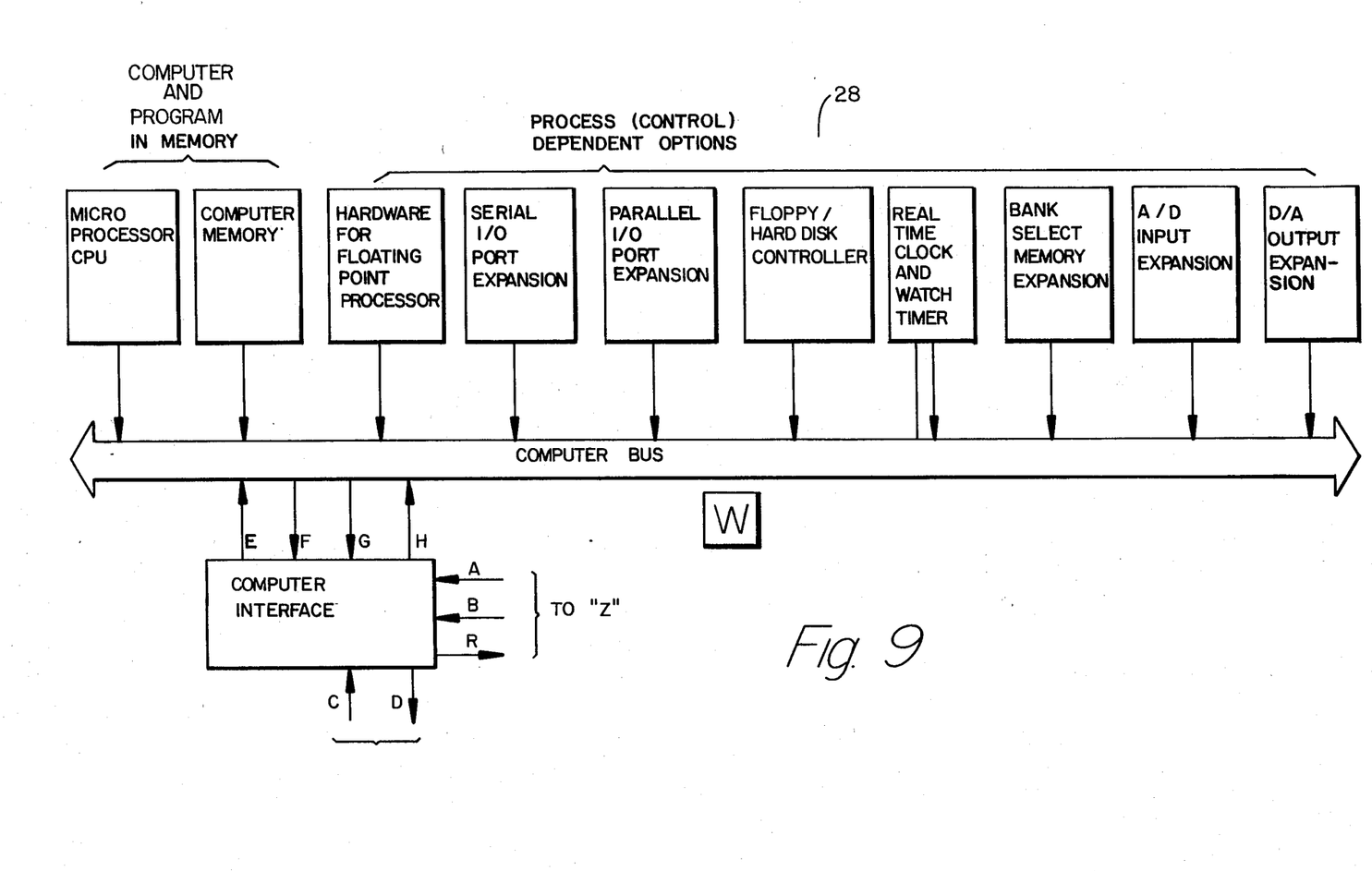
FIG. 9 is a systems view of the various computer interfaces of the system of FIG. 8.

The internal hardware of computer means 28 (Subsystem W), and its connection with computer interface 26 is shown in FIG. 9. The various hardware functions coming off the computer bus are shown in FIG. 9. It is to be noted that the functions of FIG. 9 represent but one embodiment of the computing means suitable for control purposes.

Shown, coming off the computer bus, in FIG. 9 is a microprocessor CPU, computer memory, hardware for floating point math, a serial input/output expander, parallel input/output point expanders, floppy/hard disk controller, a real-time clock watch-dog timer, and bank select memory expansion.

As shown in FIG. 9, Signals E, F, G and H all interact with computing means W. The controlling commands from computing means W are then transmitted to the motor to produce Signals Q, R and T, while the interface X must receive Signals A, B, P and S.

It is to be understood that, for economy in the internal operation of processing, the various signal inputs may be and otherwise are manipulated through both Boolean and non-Boolean functions in order to achieve whatever control program has been given to the processor.

The force which the armature of the present position servomotor can exert is in the range of 0 to 15 lbs. Further control of the force of the armature can be accomplished through the use of a pressure transducer to more particularly regulate torque current Signal C.

It is to be appreciated that in the above-described system, the computing means W is continuously employing motor Signals A, B, P and S, passing these through an algorithm corresponding to a particular hemodynamic (or other) situation and, therefrom, generating control output Signals Q, R and T to precisely control the position, velocity, and force of the armature within a given timeframe. In that the frequency of the excitation current is, in a preferred embodiment, 45,000 Kilohertz, the time domains in which the feedback control signals are constantly generated will be very small. Thereby, a high degree of accuracy in operational control of the armature will be obtained.

While there have been shown and described the preferred embodiments of the present invention, it will be understood that the invention may be embodied otherwise than as herein specifically illustrated or described and that within said embodiments certain changes in the detail and construction, and the form and arrangement of the parts, may be made without departing from the underlying ideas or principles of this invention within the scope of the appended claims.

Having thus described my invention what I claim as new, useful and non-obvious and, accordingly, secure by Letters Patent of the United States is:

1. A closed-loop linear position servomotor including a servo-amplifier, comprising:
 (a) a hollow, tubular stator having radially disposed throughout the shell thereof a plurality of magnetically symmetric field magnets, each having its magnetic axis directed to the radial center of said stator, said stator further comprising a plurality of symmetric, longitudinally disposed feedback windings, the longitudinal extent thereof corresponding to the extent of change of linear position of the servomotor, said feedback windings comprising the secondary windings of the servomotor; and
 (b) radially within said stator, an elongate armature having a radius smaller than the radius of said stator, said armature longitudinally wound with high current excitation windings, said excitation windings comprising the primary windings of the servomotor, the longitudinal length of said windings corresponding in length to at least the longitudinal length of said feedback windings of said stator, wherein the difference in radii between said armature and said stator define an air gap and, further wherein, current flowing through said excitation windings will magnetically interact with said secondary windings of the stator responsive to the character of the electrical input to said excitation windings, whereby said feedback windings will magnetically monitor motion and force of said armature relative to said stator to thereby generate a corresponding motion and force feedback to said servo-amplifier to thusly produce a corrected excitation signal to said excitation winding to provide continuously corrected linear motion and force to said armature.

2. The servomotor as recited in claim 1, further comprising:
 (c) sensing and interface means electromagnetically coupled to said motor for monitoring the position of the armature relative to a reference position; and
 (d) feedback means for (i) communicating the output of said sensing means to a processing means and, therefrom, (ii) generating a feedback signal to said excitation windings to thereby effectuate a correction or control of the armature parameters relative to the stator position and other criteria.

3. The servomotor as recited in claim 2, in which said excitation windings comprise a first group and a second group, said first group disposed radially opposite said field magnets, and said second group disposed radially opposite said feedback windings, said first group defining with said field magnets a force control means, and said second group defining with said feedback windings a motion control means.

* * * * *